United States Patent [19]
Ochoa

[11] Patent Number: 4,997,020
[45] Date of Patent: Mar. 5, 1991

[54] COLLAPSIBLE TIRE BEAD SEATING TOOL

[76] Inventor: Sandy Ochoa, P.O. Box 1886, Ruidoso Downs, N. Mex. 88346

[21] Appl. No.: 511,322

[22] Filed: Apr. 19, 1990

[51] Int. Cl.⁵ .......................................... B60C 25/12
[52] U.S. Cl. ................................................ 157/1.21
[58] Field of Search .............. 157/1.1, 1.21, 1.42–1.45, 157/1.2; 269/130, 132, 43, 44; 254/50.1, 50.4

[56] References Cited

U.S. PATENT DOCUMENTS

| | | | |
|---|---|---|---|
| 1,992,322 | 2/1935 | Nulf et al. | 269/130 X |
| 2,816,603 | 12/1957 | Swarthout | 157/1.21 |
| 2,998,055 | 8/1961 | McConkie | 157/1.21 |
| 3,480,067 | 11/1969 | Inglewitz . | |
| 3,578,059 | 5/1971 | Uhen et al. . | |
| 3,710,837 | 1/1973 | Blomgren et al. . | |
| 4,166,493 | 9/1979 | Bosen . | |

FOREIGN PATENT DOCUMENTS

782006  8/1957  United Kingdom ............... 157/1.21

Primary Examiner—D. S. Meislin
Attorney, Agent, or Firm—Edward C. Jason

[57] ABSTRACT

A seating tool for facilitating the seating of a tubeless tire on a rim. The seating tool includes a plurality N of relatively inflexible arcuate segments each having a head end, a tail end, and a curved inner surface, N being equal to three or more. The arcuate segments are positioned in a head-to-tail configuration to form a closed approximately circular hoop in which the head end of each segment is in overlapping sliding relationship to the tail end of the adjacent segment. The seating tool also includes a plurality N of threaded tightening mechanisms which are connected to the hoop in the vicinity of respective regions of overlap to vary the arcuate lengths of such regions and thereby apply a symmetrically distributed compression force to a tire positioned within the hoop.

22 Claims, 4 Drawing Sheets

COLLAPSIBLE TIRE BEAD SEATING TOOL

BACKGROUND OF THE INVENTION

The present invention relates to tire bead seating tools and is directed more particularly to a collapsible tire bead seating tool that is specially adapted for use in seating the beads of heavy tubeless truck tires.

One of the chief difficulties associated with the changing of tubeless tires is the difficulty of establishing the initial airtight seal between the bead of the tire and the bead-seating surface of the rim on which it is to be mounted. This difficulty results from the fact that, when a tire is uninflated, the opening or gap between its bead and the bead-seating surface of the rim is often so large that seating is prevented by the leakage of inflating air therethrough. The problem is that, at the same time that a large gap renders the tire unable to hold air, the inability of the tire to hold air prevents it from expanding so as to reduce the size of the gap. This problem is most serious in the case of heavy truck tires, particularly radial truck tires, because the stiffness of such tires makes them resistant to forces that tend to reduce the gap sufficiently for seating to occur.

Prior to the present invention a number of different tools have been developed in an attempt to solve the above described problem. One class of such tools, which are best described as pneumatic although they may include some non-pneumatic elements, rely on tubes of elastomeric material that are inflated to compress the periphery of the tire. One example of such a tool is described in U.S. Pat. No. 3,480,067, issued to M. Iglewitz on Nov. 25, 1969.

another class of such tools, which are best described as mechanical although they may include pneumatic or hydraulic actuating elements, rely on flexible belts or chains that are shortened in an attempt to compress the periphery of the tire. Example of tools of this type are described in the following U.S. Pat. Nos. 3,578,059, issued to J. Uhen, et al. on May 11, 1971, 3,710,837, issued to O. Blomgren, et al. on Jan. 16, 1973; and 4,166,493, issued to B. Bosen on Sept.4, 1979. An example of a purely mechanical, ratchet driven seating tool is a model T130 bead expander sold under the trademark "Ken-Tool".

In spite of the variety and ingenuity of the above described types of seating tools, it is not uncommon to encounter tubeless truck tires, particularly radial truck tires, which can be seated only with great difficulty, after numerous attempts, or which cannot be seated at all. One reason for this limited success is the fact that such seating tools do not take into account the effect of the extremely high levels of friction between the flexible belts, etc. and the tread of the tire. One such effect, which is most common in relatively compressible truck tires such as bias ply truck tires, is that the tire is compressed more in the vicinity of the belt shortening mechanisms than it is elsewhere, i.e., is subjected to a compressive force which is distributed non-uniformly or asymmetrically around the outer periphery of the tire. This asymmetrical distribution, in turn, propagates to the interior periphery of the tire where it is manifested as an asymmetry in the tire-rim gap, thereby reducing the probability that the tire will seat easily.

A similar effect, which is most common in relatively incompressible tires such as radial truck tires, is that the tire slips more in relation to the flexible belts in the vicinity of the belt shortening mechanism than it does elsewhere. As in the case of bias ply tires, the result is an asymmetrical distribution of force around the outer periphery of the tire and a corresponding asymmetry in the tire-rim gap, again reducing the probability that the tire will seat easily.

Another reason for the limited success of seating tools used prior to the present invention is the fact that, to the extent that they recognize the negative effect of tool-induced tire asymmetries at all, they tend (1) to attribute such effects to the geometrical asymmetries of the tool that result from the shortening of their belts and (2) to deal with such tool asymmetries by making their belts relatively flexible The idea behind this approach is apparently to rely on the effect of the outward radial forces exerted by the tire to force the belt to remain substantially circular as it is shortened. The problem with this approach is that, while it deals with tire asymmetries that result from non-circular tool geometries, it does not deal with tire asymmetries that result from the concentration of tire compression or slip in the vicinity of the belt shortening mechanism.

Summary of the Invention

In accordance with the present invention there is provided an improved seating tool which minimizes the tire asymmetries that result from noncircular tool geometries, and at the same time minimizes the tire asymmetries that result from the frictionally induced concentration of compression and/or slip. More particularly, the present invention minimizes the tire asymmetries that result from non-circular tool geometries by adopting a structure which, though relatively inflexible, maintains an approximately circular shape as it is tightened. At the same time, the present invention minimizes the tire asymmetries that result from frictionally induced compression and/or slip by distributing the compression/slip sites approximately equally around the periphery of the tire and by utilizing tightening mechanisms which provide a smooth, continuous tightening action.

Generally speaking, the seating tool of the present invention comprises a smoothly collapsible hoop that includes a plurality N (N being three or more) of relatively inflexible arcuate segments which are joined into a closed approximately circular structure by a plurality N of threaded tightening mechanisms that bridge the junctions between adjacent segments The closedness of this structure is assured by making the arcuate length of each segment somewhat greater than the circumference of the largest tire to be seated divided by N. The smooth collapsibility of this structure is assured by connecting the ends of adjacent segments to form N sets of overlapping sliding arcuate contacts with one another. As the tightening mechanisms are tightened by approximately equal amounts, the hoop collapses approximately symmetrically, while maintaining its circular shape, as the arcuate lengths of the N sliding contacts between the segments increase The effect of this collapse is not only to eliminate the tire asymmetries that result from non-circular tool geometries, but also to symmetrically distribute the portions of the tire where slip/compression is concentrated over N approximately equally spaced sites around the circumference of that tire. These effects, in turn, substantially increase the symmetry of the tire-rim gap and thereby greatly increase the probability that the tire will seat the first time that air is applied.

In accordance with one important feature of the present invention, the seating tool is divided into N units which may be detached from one another to form a compact disassembled structure which is easily stored and transported. In the preferred embodiment each of these units is configured so that, when they are assembled into a closed structure, the portions of the structure that are in the vicinity of respective tightening mechanisms are relatively inflexible, while the remaining portions thereof are relatively flexible, but still resistant to being easily bent by a human being without the aid of a tool. In a first form of the preferred embodiment, this property is assured by utilizing N non-symmetrical segments, each of which has one relatively inflexible end and one relatively flexible end, which segments are connected to one another in a head-to-tail configuration. In an equivalent form of the preferred embodiment, this property is assured by utilizing N relatively flexible symmetrical segments, and by bridging respective pairs of such segments by N relatively inflexible symmetrical segments. Various forms of the invention which are intermediate these two embodiments are also possible, as will be explained more fully hereinafter.

In accordance with another important feature of the present invention, the seating tool includes N tightening mechanisms each of which in turn includes one or more threadedly engaged pairs of engaged male and female threaded members, the male member of each pair being supported in the vicinity of one end of each segment and the female member of each pair being supported in the vicinity of the opposite end of the adjacent segment. In each such tightening mechanism the longitudinal axis of the male threaded member is positioned in close proximity and in approximately parallel relationship to a tangent to the hoop in the vicinity of a respective region of overlap between adjacent segments. This positioning assures that the greatest possible fraction of the tightening force is exerted tangentially with respect to the hoop in general and along the surface of the overlapping sliding contacts in particular. This, in turn, helps to maintain the circularity of the hoop and to prevent the segment ends from being driven into the tire during tightening.

In all of the preferred embodiments of the present invention, each of the tightening mechanisms includes at least one driving surface that is adapted to be driven by a pneumatic or impact wrench. This driving surface preferably comprises the external surface of a nut (a female threaded member) or of the head of a bolt (a male threaded member) or an equivalent surface, such as a surface that is adapted to be driven by a pneumatic wrench that is equipped with phillips-head or allen-wrench drive elements In all such embodiments, it is the clearance necessary to permit the drive element to engage the driving surface that fixes the distance between the hoop and the longitudinal axis of the male threaded member, a distance which the present invention prefers to keep as small as possible.

While the use of a pneumatic wrench driving drive surface to drive the tightening mechanisms of the invention may appear to be a mere matter of choice or convenience, this appearance is deceptive. This is because the mechanical vibrations that are produced by a pneumatic wrench are regarded as beneficial in that they help the overlapped regions of the hoop "settle into" a low-energy configuration with respect to the tire. This low energy configuration is believed to be associated with the relatively symmetrical distribution of slip and/or compression over the part of the tire that is located near each tightening mechanism.

In instances involving tires which are unusually difficult to seat, the present invention preferably includes tightening mechanisms and/or overlap configurations which assure that the hoop collapses symmetrically with respect to those mechanisms and configurations. In embodiments which have the above-mentioned head-to-tail configuration this result may be accomplished by using a tightening mechanism, such as that to be described in connection with FIG. 7, in which the tightening of the mechanism moves the ends of adjacent segments equal distances with respect to the mid-point of their overlap. Similarly, in embodiments which have the above-mentioned bridging configuration, such as that to be described in connection with FIGS. 8A-8D, this result may be accomplished by using a tightening mechanism that moves adjacent segments equal distances with respect to the intervening bridging segment.

Description of the Drawings

Other obJects and advantages of the present invention will be apparent from the following description and drawings in which.

DESCRIPTION OF THE PREFERRED EMBODIMENTS

Figure 1A:
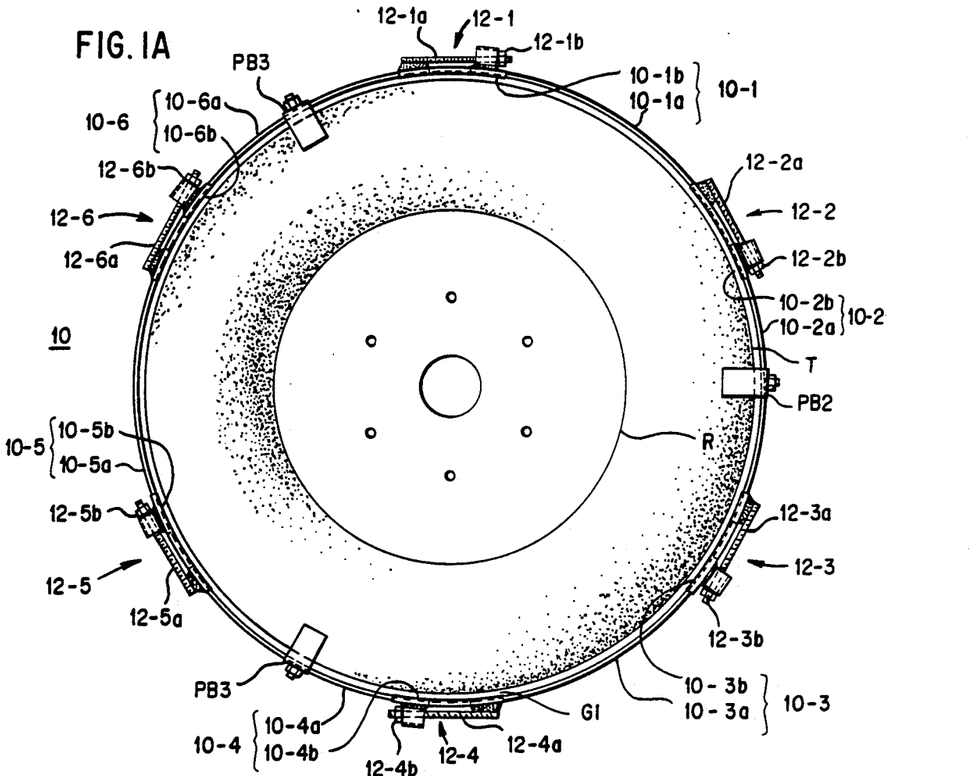
FIG. 1A is a plan view of the preferred embodiment of the invention.

Referring to FIG. 1A there is shown a plan view of the preferred embodiment of the seating tool of the present invention, the tool being shown in the fully assembled condition in which it is ready to be used to facilitate the seating the bead of a tire T on the bead-seating surface of a rim R. In the embodiment of FIG. 1A the seating tool of the invention comprises a collapsible hoop or segment mechanism 10 which is positioned approximately along the central plane of tire T by positioning brackets PB1, PB2 and PB3, each of which may have the shape shown in FIG. 1D. In FIG. 1A hoop mechanism 10 is shown in the loosened or non-collapsed form in which it creates the tire-hoop clearance gap GI (shown greatly enlarged for the sake of clarity) that allows hoop 10 to be easily slipped over the tire to be seated Hoop 10 is preferably slipped over tire T when the latter is resting with its sidewall on the ground, thereby assuring that the weight of the tire and hoop do not produce an asymmetry in the shape of the tire-rim gap between the bead of tire T and the bead-seating surface of rim R.

In the embodiment of FIG. 1A hoop mechanism 10 includes a plurality N (where N=6) of arc-shaped or arcuate segments 10-1 through 10-6 which are connected into a closed approximately circular figure by N threaded tightening mechanisms 12-1 through 12-6. The structure of tightening mechanism 12-1 and its relationship to associated arcuate segments 10-1 and 10-6 are most easily seen in FIGS. 1B and 1C, which comprise enlarged front and end views thereof. In the latter figures the tightening mechanism is shown in a "flattened" form in which the effects of the local curvature of hoop 10 are suppressed in order to simplify the drawings.

Figure 1B:
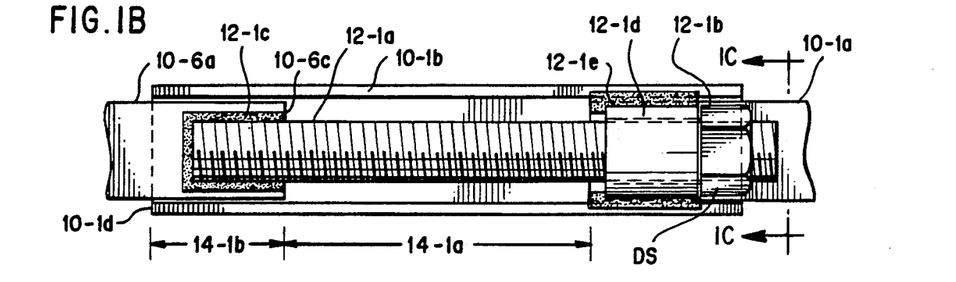
FIGS. 1B and 1C show enlarged fragmentary front and end views of one of the six tightening mechanisms of FIG. 1A.
Figure 1C:
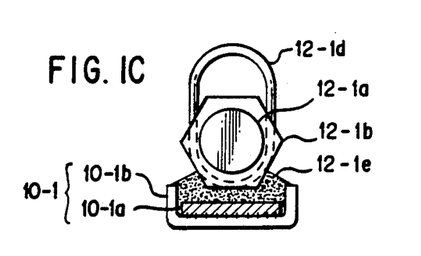
Figure 1D:
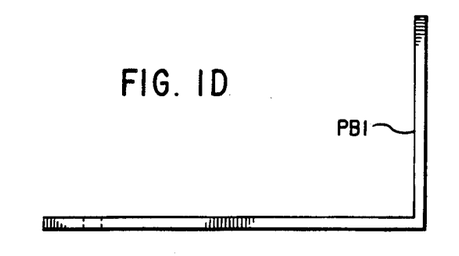
FIG. 1D shows an enlarged side view of one of three positioning brackets of FIG. 1A.

Each of the above-named tightening mechanisms is formed by a threadedly engaged set of male and female threaded members that are supported in the vicinity of respective opposite ends of adjacent segments. Tightening mechanism 12-1, for example, is formed by a male threaded member 12-1a (which may comprise a length of threaded stock) that is, non-rotatably attached to the head end 10-6c of segment 10-6 by a weld 12-1c, and by a female threaded member 12-1b (which may comprise a nut) that is rotatably attached to segment 10-1 at a point a fixed distance away from end 10-1d thereof by the combined action of a tangential thrust supporting member 12-1d, a weld 12-1e and male member 12-1a. Since the threads of male member 12-1a and female member 12-1b, must be able to withstand the strong tensile forces generated during the collapse of the hoop, these threads are preferably heavy-duty 29 pitch threads of the type commonly referred to as Acme threads.

Because nut 12-1b is free to rotate with respect to male member 12-1a, and because the end 10-6c of segment 10-6 is held in place against segment 10-1 only by threaded members 12-1a and 12-1b, it follows that as nut 12-1b is rotated in a clockwise direction (as viewed in FIG. 1C) it pulls male member 12-1a and segment 10-6 to the right (as viewed in FIG. 1B) and thereby reduces the arcuate length of region 14-1a. As will be explained more fully hereinafter, region 14-1a fixes the maximum amount by which the tightening of tightening mechanism 12-1 can reduce the circumference of the hoop and thereby the range of tire sizes with which the hoop may be usefully employed In view of the fact that nut 12-1b controls the tightening and loosening of tightening mechanism 12-1, it will be seen that the outer surface DS of nut 12-1b serves as the driving surface of tightening mechanism 12-1. For reasons which will be discussed later, the driving surfaces of all embodiments of the invention are preferably shaped so that they may fit into the socket (or equivalent element) of a pneumatic wrench. In the case of the embodiment of FIG. 1A–1D, this socket must be a deep socket in order to allow the end of male member 12-1a to move to the right during tightening.

In the embodiment of FIG. 1 tightening mechanisms such as 12-1 bridge the ends of respective adjacent pairs of segments such as 10-1 and 10-6 only when the segments are assembled into a closed figure in which each set of male and female threaded members are threadedly engaged. When not so assembled, i.e., when nuts such as 12-1b are removed and male threaded members such as 12-1a are pulled through respective thrust members such as 12-1d, hoop 10 breaks down into a plurality of separate, virtually identical arcuate units (neglecting the presence of positioning brackets PB1-PB3) each having one end which is adapted to support a male threaded member at one end and a female threaded member at the other. The ability of hoop 10 to be broken down into such units not only greatly simplifies the manufacture of hoop 10, but also allows it to be packed into a small space and to be easily transported.

In accordance with one important feature of the present invention, each hoop segment such as 10-1 has a curved inner surface 10-1e which has an arcuate length larger than the circumference of tire T divided by N. This arcuate length assures that, when the hoop segments are assembled into a closed structure, the head or overlying end (e.g. 10-6c) of each segment assumes an overlapping relationship to the tail or underlying end (e.g. 10-1d) of the adjacent segment to define a arcuate region of contact such as 14-1b. Because the segment ends which define contact regions such as 14-1b are free to slide circumferentially over one another, and are attached to relatively movable portions of respective tightening mechanisms such as 12-1, it will be seen that the tightening and loosening of the tightening mechanisms increases and decreases the arcuate lengths of the respective sliding contacts. Because the sum of the arcuate lengths of regions such as 14-1a and 14-1b is equal to a constant, it will also be seen that region 14-1a represents the maximum amount by which the arcuate length of sliding contact 14-1b may be increased by the tightening of tightening mechanism 12-1.

Viewed from the standpoint of the hoop as a whole, the above-described action assures that the approximately equal tightening of all of the tightening mechanisms results in an approximately equally distributed reduction in the circumference of the hoop. This equally distributed reduction in circumference, in turn, symmetrically reduces the radius of the hoop and thereby causes approximately equal compressive forces to be applied to the tire from N equally spaced directions. These forces both reduce the size of tire-rim gap and render symmetrical the distribution of slip/compression in the vicinity of that gap, thereby greatly increasing the probability that the tire will seat as soon as inflating air is applied.

Figures 2A, 2B, 2C:
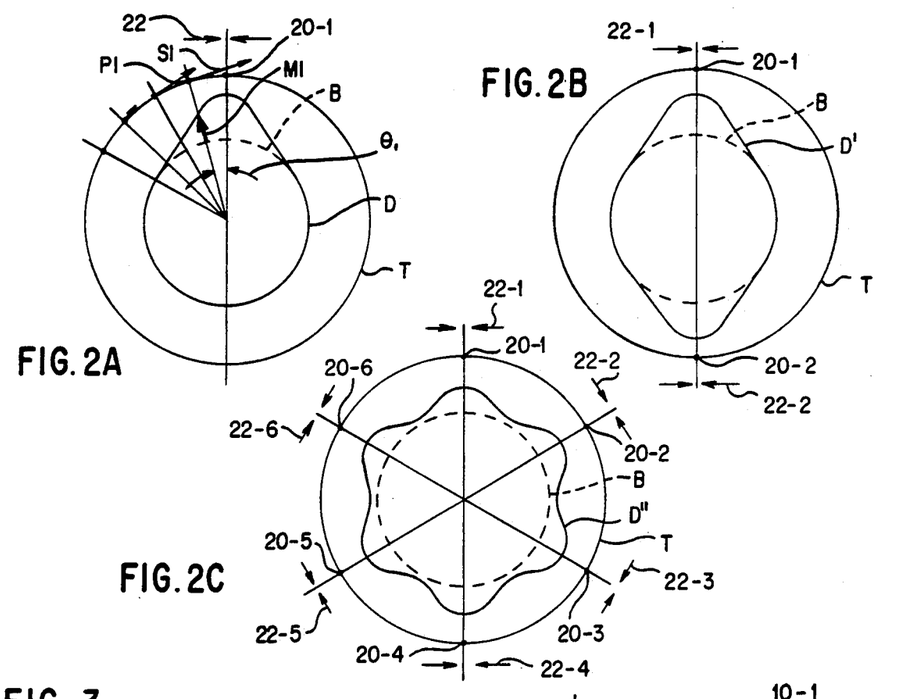
FIGS. 2A-2C show idealized slip/compression diagrams for seating tools having different numbers of tightening mechanisms.

The manner in which the effect produced by the above-described action differs from that produced by seating tools used prior to the present invention is most easily visualized with reference to FIGS. 2A through 2C. Referring first to FIG. 2A, there is shown a tire T which is to be seated on a rim (not shown) by a seating tool (not shown) which includes a single tightening mechanism (not shown) which may be of any of the types disclosed by the above-cited references. The site at which the tightening occurs is indicated by the number 20-1 and the direction of the tightening action is indicated by a pair of arrows 22. Also shown in FIG. 2A is a slip/compression diagram D which indicates, as a function of angular position with respect to site 20-1, the magnitude of the circumferential slip (in the case of radial tires) or circumferential compression (in the case of bias ply tires) which is produced by the tightening mechanism. The length of slip vector M1, for example, represents the magnitude of the circumferential slip S1 at a point P1 on the periphery of the tire which is located at an angle 01 from tightening site 20-1. It should be noted that slip vector MI is plotted in relation to a circular baseline B, shown in dotted lines, which represents a zero slip reference level.

From the shape of slip diagram D of FIG. 2A it will be seen that a seating tool with a single tightening site produces in the tire a distribution of slip (or compression) which is concentrated in the vicinity of that tightening site. This concentration, which is reflected by the generally egg-shape of diagram D, manifests itself as an asymmetry in tire-rim gap, causing a reduction in the probability that the tire will seat easily when air is applied.

Referring to FIG. 2B, there is shown a slip/compression diagram D' which is similar to that discussed in connection with FIG. 2A, except that it shows the distribution of slip (or compression) that is produced by a seating tool that includes two tightening sites 20-1 and 20-2. Diagram D' of FIG. 2B shows that doubling the number of tightening sites results in a football-shaped distribution of slip (or compression). Because such a distribution is similar to that produced by squeezing a tire along one of its diameters, this distribution is even less desirable than that shown in FIG. 2A. This is because such squeezing tends to distort the bead of a tire in a way that opens two diametrically opposed openings for the leakage of inflating air.

Referring to FIG. 2C, there is shown a slip/compression diagram D" which shows the distribution of slip/-compression that is produced by the embodiment of the invention shown in FIG. 1A, i.e., an embodiment which includes six equally spaced tightening sites 20-1 through 20-6. Diagram D" shows that, by making the number of tightening sites equal to six, a new symmetry-producing effect is brought into play, namely: the overlap of the slip/compression produced by adjacent tightening sites. The effect of this overlap is reflected by the fact that no point of contact exists between baseline B and diagram D", indicating that there is at least some slip/compression at all points around the periphery of the tire. Moreover, to the extent that equal degrees of tightening occur at each tightening site, diagram D" indicates that the slip/compression is distributed symmetrically around the periphery of the tire, thereby greatly increasing the probability that the tire will seat easily.

The number N of tightening sites at which the above-described new effect occurs is related to the structure of the tire to be seated. For tires such as bias ply tires that are relatively compressible, N may be as few as three. For tires such as radial tires that are relatively incompressible, N is preferably six or even more. In both cases the number of tightening sites is preferably even. This is because an embodiment of the invention which has an even number of tightening sites exhibits a higher degree of symmetry than an embodiment which has an odd number of such sites.

In view of the foregoing it will be seen that the number N of tightening sites contemplated by the present invention is equal to three or more and is preferably even.

As a practical matter the slip/compression diagrams of FIGS. 2A-2C all exhibit a higher degree of symmetry than can be expected from a real tire, unless special measures are taken to assure that symmetry. This is because the shape of the slip/compression diagram in the vicinity of a tightening site is strongly dependent on how the tightening is accomplished. The symmetry about the axis through site 20-1 in each of FIGS. 2A-2C, for example, will be exhibited in the form shown therein only to the extent that the tightening mechanism produces slip or compression smoothly and symmetrically on both sides of that axis, a result that is not to be expected from a tightening mechanism that is not designed with this result in view. It will therefore be seen that the advantages of increasing the number of tightening sites will be fully realized only to the extent that this increase is coupled with the use of tightening mechanisms which act smoothly and continuously on the tire on both sides of the tightening site. The manner in which the present invention provides such action will now be explained in connection with the embodiment of FIG. 1.

Referring again to FIGS. 1A-1C, there are a number of structural features shown therein which contribute to the smooth, continuous, symmetrical tightening action just described. One of these features is the use of threaded tightening members such as 12-1a and 12-1b. The use of such threaded members allows the tightening action to be accomplished without discontinuous movements such as those incident to the use of ratchet or over-center mechanisms, and at the same time provides the high mechanical advantage or leverage that allows the external driver (such as an impact wrench) to drive the tightening mechanisms easily.

Another of these features is the use of segments having overlapping ends with similar degrees of curvature. This similarity of curvature allows the arcuate lengths of the sliding contacts between the ends of adjacent segments to increase or decrease without generating substantial asymmetry-producing forces within the hoop, at least over the range of motion permitted by regions such as 14-1a. As a result, the hoop is able to collapse smoothly and thereby produce distributions of slip/compression which are symmetrically distributed with respect to the various tightening sites. The symmetry of this distribution is further increased by the use of a pneumatic-wrench as an external driver. This is because the vibrations incident to the use of such a wrench enhance the ability of the segments to slide smoothly both with respect to one another and with respect to the tire.

Still another of the advantageous features of the embodiment of FIG. 1 is the use of segments which are relatively inflexible or even substantially rigid in the vicinity of the tightening sites and relatively flexible between the tightening sites. The reason that such a flexibility relationship is advantageous is that, on the one hand, the relatively flexible parts of the hoop afford some release for the stresses that are incident to the collapse of the hoop while, on the other hand, the relatively inflexible parts of the hoop tend to prevent the segment ends from being driven into the tire in the vicinity of the overlap regions.

In the embodiment of FIG. 1 this flexibility relationship is provided by utilizing segments such as 10-1 which have a relatively flexible strap-shaped head portion 10-1a and a relatively inflexible channel-shaped tail portion 10-1b. Such a non-symmetrical structure is easily constructed by welding together, as at weld 12-1e, the end of a strap-shaped arcuate segment in place in the internal groove of a channel-shaped arcuate segment. The latter structure has the advantage that it allows the hoop to be assembled from a set of virtually identical segment units The equivalent effect may also be produced, however, by utilizing a structure such as that shown in FIG. 9A (from which the tightening mechanism has been deleted for the sake of clarity) in which pairs of relatively flexible strap-shaped arcuate segments 10-1'' and 10-6'' are bridged by a relatively inflexible channel-shaped arcuate segments 10-1/6, the ends of both flexible segments overlapping and being free to slide with respect to the intervening inflexible segment. Certain additional advantageous features of the structure shown in FIG. 9A will be discussed in greater detail hereinafter.

Still other advantageous features of the embodiment of FIG. 1 include the positioning of the longitudinal axes of the male threaded tightening members such as 12-1a so that they are approximately parallel to lines that are tangent to the hoop in the vicinity of the respective sliding contacts such as 14-1b. These tightening members are also positioned so that they are as close as possible to the hoop, consistent with the need for an impact wrench to drive the driving surfaces of the tightening mechanisms. Together these features are advantageous both because they minimize the radial components of the forces produced by the tightening of the tightening mechanisms, and because they assure the availability of the benefits produced by the vibrations incident to the use of an impact wrench.

The just-described advantages are most fully realized when each tightening mechanism provides for a certain amount of "play" or looseness within its own structure. In the embodiment of FIGS. 1A–1D, for example, this play is provided by making the hole (or slot) 12-1d1 through which male member 12-1a penetrates thrust member 12-1d large enough to allow male member 12-1a to adjust its position slightly as the tightening mechanism is tightened. This adjustment of position tends to relieve some of the asymmetry producing forces which are incident to the collapse of the hoop, and is aided by the vibrations produced by the use of an impact wrench as an external driver.

Figure 3:
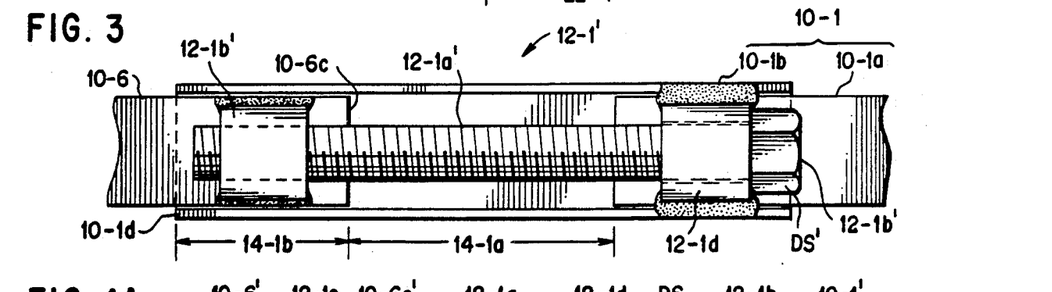
FIG. 3 shows fragmentary front view of an alternative embodiment of one of the tightening mechanisms shown in FIG. 1A.

Referring to FIG. 3 there is shown a fragmentary front view of an embodiment of the invention which is similar to that shown in FIG. 1B, except that the relative positions and roles of the male and female threaded members are interchanged. In FIG. 3 the elements whose positions and roles are unchanged from FIG. 1B are assigned the same numbers as in FIG. 1B, while the numbers of the elements in FIG. 3 whose male-female positions have been reversed are distinguished from the corresponding elements in FIG. 1B by a prime ('). Female threaded member 12-1b' of FIG. 3, for example, is immovably attached to segment 10-6 rather than rotatably attached to segment 10-1 as in FIG. 1B. Similarly, male threaded member 12-1a' of FIG. 3 is rotatably attached to segment 10-1 rather than immovably attached to segment 10-6 as in FIG. 1B. Finally, the driving surface DS' of tightening mechanism 12-1' of FIG. 3 forms a part of male threaded member 12-1a' rather than a part of female threaded member 12-1b as in FIG. 1B.

In spite of the above-summarized differences, the tightening action of the embodiment of FIG. 3 is the same as that of the embodiment of FIG. 1B except in one major respect. This is that, since the end of male member 12-1a' in FIG. 3 does not move toward driving surface DS' during tightening, as in FIG. 1B, tightening mechanism 12-1' of FIG. 3 may be driven by a regular socket rather than a deep socket. Because all other differences between the embodiments of FIGS. 1B and 3 are of minor nature, the embodiment of FIG. 3 will not be further described herein.

Figures 4A, 4B:
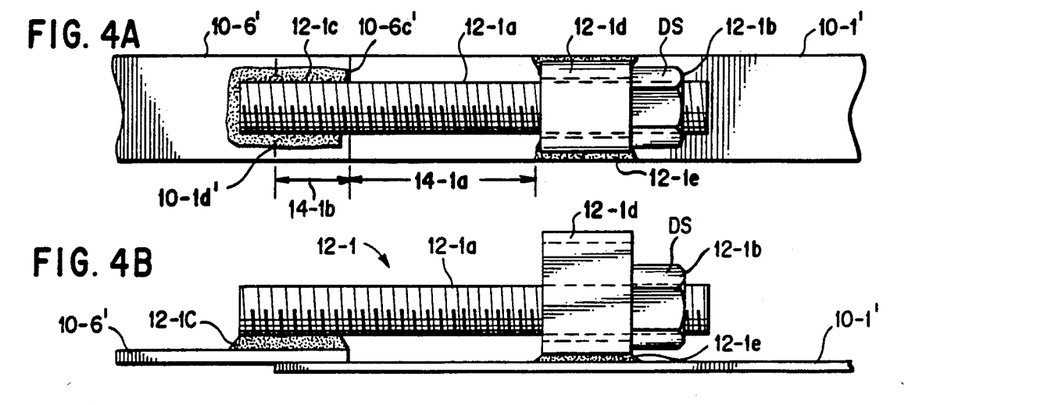
FIGS. 4A and 4B show fragmentary front and side views of another alternative embodiment of one of the tightening mechanisms shown in FIG. 1A.

Referring to FIGS. 4A and 4B there are shown fragmentary front and side views, respectively, of an embodiment of the invention which is similar to that shown in FIG. 1, except that the embodiment of FIGS. 4A and 4B uses segments which do not have the differing head and tail end structures which are present in the embodiment of FIG. 1. More particularly, the hoop mechanism of the embodiment of FIGS. 4A–4B includes a plurality of arcuate segments which comprise simple arcuate straps 10-1' and 10-6' of uniform thickness that are joined so that the head end 10-6c' of the latter overlaps the tail end 10-1d' of the former Because a hoop constructed in accordance with FIGS. 4A–4B does not include segments which have relatively inflexible sections in the vicinity of the respective sliding contacts it has a greater tendency to drive the end 10-1d' of the underlying segment into the tire than embodiments like that of FIGS. 1A–1C that do have such sections. As a result, embodiments of the type shown in FIG. 4 are not preferred. They are nevertheless regarded as within the scope of the present invention and will perform satisfactorily with most tires.

Figure 5A:
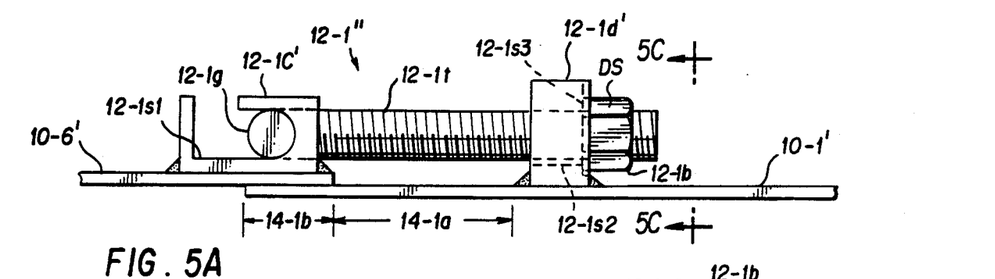
FIGS. 5A, 5B and 5C show fragmentary side and end views of yet another alternative embodiment of one of the tightening mechanisms shown in FIG. 1A.
Figure 5B:
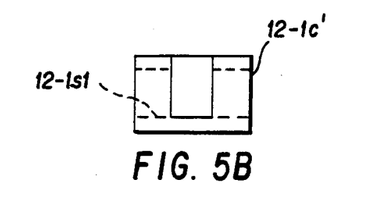
Figure 5C:
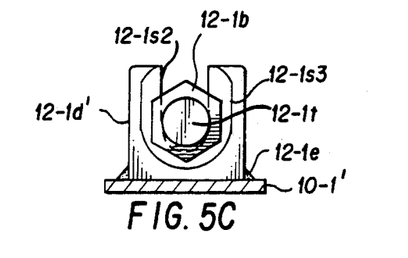

Referring to FIGS. 5A and 5B there are shown fragmentary side and end views, respectively, of an embodiment of the invention which is broadly similar to that of FIG. 4, except that in the embodiment of FIGS. 5A and 5B a T-bolt 12-1t replaces the length of threaded stock 12-1a of FIG. 4. One end 12-1g of this T-bolt is cradled in a T-bracket 12-1c', a detached end view of which is shown in FIG. 5C, that serves an attachment function roughly similar to that of weld 12-1c of FIG. 4. The other end of T-bolt 12-1t rests in a slotted thrust member 12-1d', an end view of which is shown in FIG. 5B, that serves an attachment function generally similar to that of thrust member 12-1d of FIG. 4.

As shown in FIGS. 5A and 5C, T-bracket 12-1c' includes a rounded axially disposed internal slot 12-1s1 which allows end 12-1g of male member 12-1t to rotate slightly with respect to the hoop while still supporting the tensile forces that are associated with the collapse thereof. As shown in FIGS. 5A and 5B, thrust member 12-1d' includes a rounded radially disposed slot 12-1s2 which allows the other end of male member 12-1t to move radially with respect to the hoop, again while supporting the tensile forces that are associated with the collapse thereof. Thrust member 12-1d' also includes a recessed thrust surface 12-1s3, best seen in FIG. 5B, which serves to retain bolt 12-1t within slot 12-1s2 while permitting the application of a drive socket to nut 12-1b.

The embodiment shown in FIGS. 5A–5C provides two advantages over the already described embodiments of the invention. One is that male member 12-1t of FIG. 5 may be easily removed from the hoop and replaced (when the hoop is in a loose condition) in the event that the threads are damaged during use. Another is that the ability of both ends of male member 12-1t to move slightly with respect to the hoop serves to relieve some of the asymmetry-producing forces that are generated during the tightening thereof, thereby increasing the symmetry of the tire-rim gap.

Figure 6A:
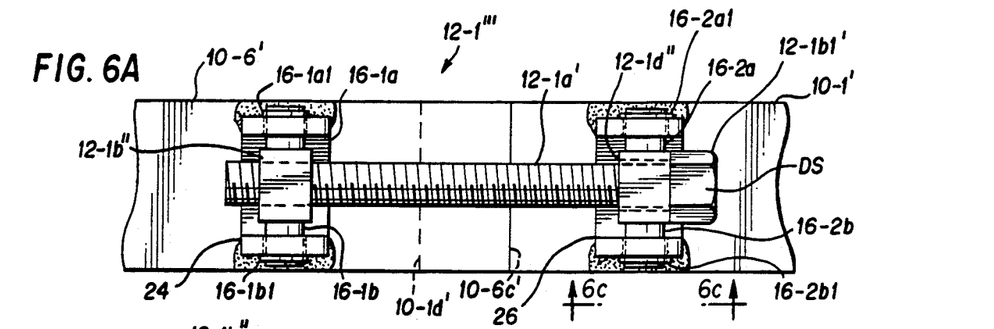
FIGS. 6A, 6B and 6C show fragmentary front and end views of still another alternative embodiment of one of the tightening mechanisms shown in FIG. 1A.
Figure 6B:
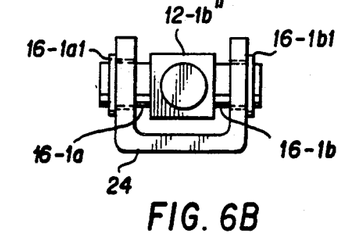
Figure 6C:
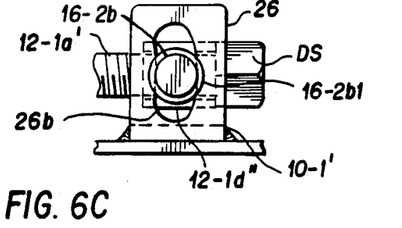

Referring to FIG. 6A there is shown a fragmentary front view of an embodiment of the invention which is broadly similar to that of FIG. 3, except that it includes a tightening mechanism 12-1''' in which the female threaded member 12-1$b''$ and thrust member 12-1$d''$ are attached in rotatable relationship to the hoop. More particularly, female threaded member 12-1$b''$ is attached to segment 10-6' by axially disposed pins 16-1$a$ and 16-1$b$ which are rotatably secured to the sides of a U-bracket 24 by respective C-washers 16-1$a$1 and 16-1$b$1, as depicted in the detached end view of bracket 24 that is shown in FIG. 6B. Similarly, thrust member 12-1$d''$ is attached to segment 10-1' by axially disposed pins 16-2$a$ and 16-2$b$ which are rotatably secured to the sides of a U-bracket 26 by respective C-washers 16-2$a$1 and 16-2$a$2, as depicted in the detached end view of bracket 26 that is shown in FIG. 6C. Bracket 26 may also be provided with slots 26$a$ and 26$b$, shown in dotted lines in FIG. 6C, which permit thrust member 12-1$d''$ to adjust its radial position with respect to the hoop during the tightening thereof.

The embodiment shown in FIGS. 6A–6C provides two advantages over the already described embodiments of the invention. One is that, because both ends of male member 12-1$a'$ are supported on pins, the only forces that member 12-1$a'$ can exert on segments 10-1' and 10-6' are forces that are aligned with the longitudinal axis of that member. This is advantageous because it eliminates the source of some of the non-tangential components of the forces that are generated during the collapse of the hoop. Another is that the rotatability of thrust member 12-1$d'''$ assures that the inner surface of the head of male member 12-1$a'$ seats squarely on the corresponding surface of thrust member 12-1$d'''$.

Figure 7:
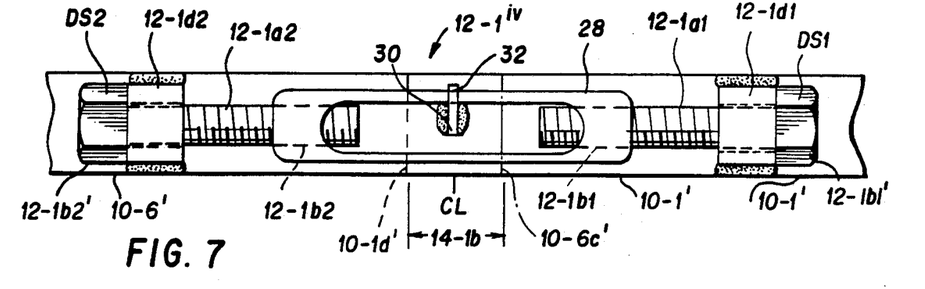
FIG. 7 shows a fragmentary front view of still another alternative embodiment of one of the tightening mechanisms shown in FIG. 1A.

Referring to FIG. 7, there is shown a fragmentary front view of an embodiment of the invention which includes a tightening mechanism 12-1$^{iv}$ that includes two male and two female threaded tightening members and which may be tightened from either end by means of respective driving surfaces DS1 and DS2. More particularly, the embodiment of FIG. 7 includes two male threaded members 12-1$a$1 and 12-1$a$2 which are threadedly engaged with respective female threaded members 12-1$b$1 and 12-1$b$2, the latter comprising threaded holes located at opposite ends of a turnbuckle or threaded sleeve 28. The embodiment of FIG. 7 also includes two thrust members 12-1$d$1 and 12-1$d$2 which are attached to respective segments 10-1' and 10-6'. Finally, the embodiment of FIG. 7 includes a stop member 30 having a slot 32 which engages one edge of turnbuckle 28 and prevents the latter from turning during the tightening of the hoop.

The embodiment of FIG. 7 provides one important advantage over the previously described embodiments of the invention, namely: its tightening mechanism 12-1$^{iv}$ provides a tightening action which is more symmetrical than those of the previously described embodiments. More particularly, when the driving surfaces DS1 and DS2 of tightening mechanism 12-1$^{iv}$ are tightened alternately, by approximately equal amounts, the ends 10-1$d'$ and 10-6$c'$ of adjacent segments 10-1' and 10-6' are moved approximately equal distances with respect to the center line CL of their overlap region 14-1$b$. This equal movement results in the symmetrical distribution of slip/compression about center line CL which, to a first approximation, coincides with the tightening site that is associated with tightening mechanism 12-1$^{iv}$. The creation of such a symmetrical distribution by the embodiment of FIG. 7 is an illustration of how the number of tightening mechanisms and the character of their tightening action interact or cooperate with one another to produce highly symmetrical slip/compression distributions such as that shown in FIG. 2C.

Figure 8A:
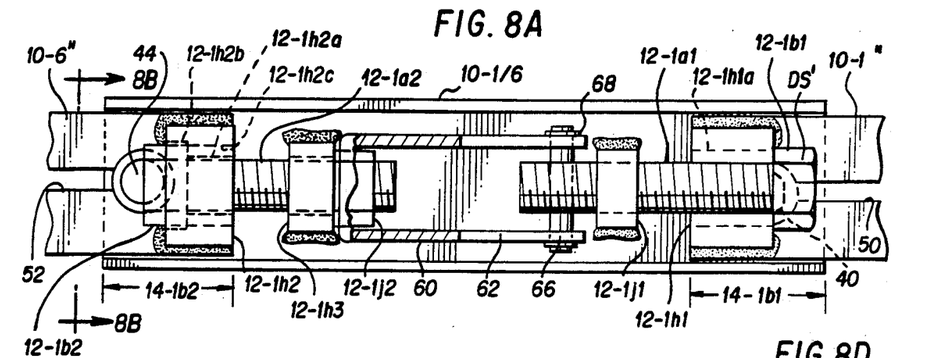
FIGS. 8A and 8B show fragmentary front and end views of still another alternative embodiment of one of the tightening mechanisms shown in FIG. 1A.
Figure 8B:
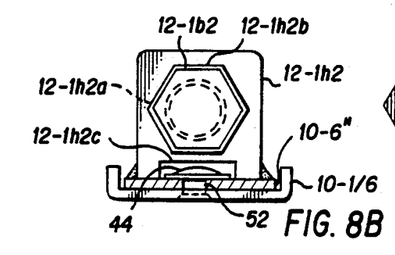

Referring to FIGS. 8A and 8B there are shown fragmentary front and end views of an embodiment of the invention which combines the best features of a number of the previously described embodiments of the invention. More particularly, the embodiment of FIGS. 8A and 8B includes a segment mechanism, of the type shown in FIG. 9A, in which pairs of relatively flexible strap-like arcuate segments 10-1'' and 10-6'' are bridged by a relatively inflexible channel-like arcuate segment 10-1/6 to which they are slidably attached by a nut 40 and bolt 42 on one end and a rivet 44 on the other. Bolt 42 passes through a slot 50 in segment 10-1'', allowing segment 10-1'' to move inwardly or outwardly with respect to the center of segment-1/6. Similarly, rivet 44 passes through a slot 52 in segment 10-6'', allowing segment 10-6'' to move inwardly or outwardly with respect to the center of segment 10-1/6. It will be understood that both bolt 42 (with nut 40) and rivet 44 serve only to hold the hoop together when it is in its untightened condition and that nut 40 is provided to allow the hoop to be disassembled into N virtually identical units when it is not being used. Optionally, nut 40 and bolt 42 may be provided with a washer 40$a$ and rivet 44 may be provided with a washer 44$a$, both of which serve to distribute the forces produced by bolt 42 and rivet 44 more widely over arcuate segments 10-1'' and 10-6'', respectively.

In addition, the tightening mechanism of the embodiment of FIGS. 8A and 8B includes two male threaded tightening members 12-1$a$1 and 12-1$a$2 which abut against respective thrust members 12-1$h$1 and 12-1$h$2. The tightening mechanism of FIGS. 8A and 8B also includes a first female threaded tightening member 12-1$j$1 which is welded to bridging segment 10-1/6 and threadedly engages male member 12-1$a$1, and a second female threaded tightening member 12-1$j$2 which abuts against a thrust member 12-1$h$3 and threadedly engages male member 12-1$a$2. Male member 12-1$a$1, female member 12-1$j$1 and thrust member 12-1$h$1 together comprise a first tightening mechanism which controls the arcuate length of the sliding contact region 14-1$b$1 between arcuate segments 10-1'' and 10-1/6. Similarly, male member 12-1$a$2, female member 12-1$j$2 and thrust members 12-1$h$2 and 12-1$h$3 together comprise a second tightening mechanism which controls the arcuate length of the sliding contact region 14-1$b$2 between arcuate segments 10-6'' and 10-1/6. It will therefore be seen that a hoop constructed in accordance with the embodiment of FIGS. 8A and 8B includes 2N tightening sites and 2N threadedly engaged sets of male and female threaded members.

Figure 8C:
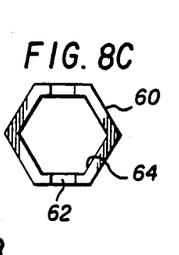
FIG. 8C shows an end view of the coupling shown in partly cutaway form in FIG. 8A.
Figure 8D:
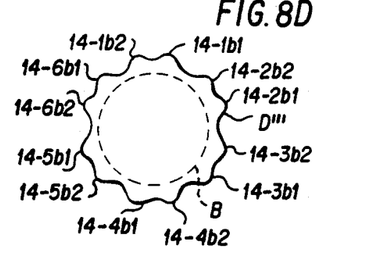
FIG. 8D shows an idealized slip/compression diagram for a seating tool having six tightening mechanisms of the type shown in FIG. 8A.

The advantage of this increased member of tightening sites is that it more widely and uniformly distributes the slip/compression that is incident to the collapse of the hoop, as shown in slip/compression diagram D''' of FIG. 8D. In the latter figure, the two slip/compression maxima that are associated with each bridging segment such as 10-1/6 are indicated by the two sliding contacts such as 14-1$b$1 and 14-1$b$2 that are associated therewith. As will be explained more fully presently, the high degree of symmetry illustrated in FIG. 8D is best realized by driving the two tightening mechanisms that are associated with each bridging segment of the embodiment of FIG. 8 simultaneously and by equal amounts.

In the embodiment of FIG. 8A thrust member 12-1$h$1 is preferably of the slotted type described in connection with thrust member 12-1$d'$ in FIGS. 5A and 5B, except in one respect. This is that the lower surface of member 12-1$h$1 is provided with a clearance slot, the edges of which are indicated by dotted lines 12-1$h$1$a$ and 12-1$h$1$b$ in FIG. 8A, that allows thrust member 12-1$h$1 to be positioned over nut 40 and bolt 42.

In the embodiment of FIG. 8A thrust member 12-1$h$2 is preferably of a type which affords male threaded member 12-1$a$2 a certain amount of play, but which does not permit it to rotate. In FIG. 8A these properties are assured by providing thrust member 12-1$h$2 with a central hole 12-1$h$2$a$ which permits the penetration of the threaded portion of bolt 12-1$a$2, and with a recessed bolt head receiving surface 12-1$h$2$b$ that prevents the rotation of the bolt head. This central hole and bolt head receiving surface are most clearly shown in FIG. 8B. Also clearly shown in FIG. 8B is the clearance slot 12-1$h$2C which allows thrust member 12-1$h$2 to be positioned over the head of rivet 44.

To the end that the tightening of the two tightening mechanisms of FIG. 8A may produce the highly symmetrical slip/compression distribution shown in FIG. 8D, it is necessary that they be tightened simultaneously and by equal amounts. In the embodiment of FIG. 8A this simultaneous equal tightening is provided by using the externally driven male member 12-1$a$1 of one tightening mechanism to drive the female member 12-1$j$2 of the other tightening mechanism. More particularly, this simultaneous equal tightening is provided by means of a coupling member 60, a cutaway view of which is shown in FIG. 8A and an end view of which is shown in FIG. 8C, that is positioned between threaded members 12-1$a$1 and 12-1$j$2. Coupling member 60 includes a driving end which includes a slot 62 that is coupled to the end of male member 12-1$a$1 by a drive pin 66, and a driven end which includes a socket-shaped opening 64 that engages female member 12-1$j$2. Drive pin 66 preferably passes loosely through an opening in the end of male member 12-1$a$1 (after the latter is threaded through female member 12-1$j$1) and is retained in place within slot 62 by suitable retaining elements such as a C washer 68 or cotter pins.

In operation, pin 66 drives coupling member 60 and female member 12-1$j$2 as it advances into slot 62 as a result of the driving of male member 12-1$a$1. As a result, each turn of the tightening mechanism including member 12-1$a$1 results in one turn of the tightening mechanism including member 12-1$a$2. This, in turn, causes arcuate members 10-1'' and 10-6'' to move simultaneously and by equal amounts with respect to arcuate member 10-1/6, and produces the double-maxima slip/compression distribution shown in FIG. 8D.

It will be understood that in the event that the tightening mechanism such as that including male member 12-1$a$1 which has a threaded end that advances during tightening is replaced by a tightening mechanism which has a bolt head that advances during tightening, pin 66 may be eliminated and slotted coupling 60 may be replaced by an unslotted coupling having socket-shaped openings at both ends. Because the structure of this embodiment will be apparent to those skilled in the art, it will not be further discussed herein.

Figure 9A:
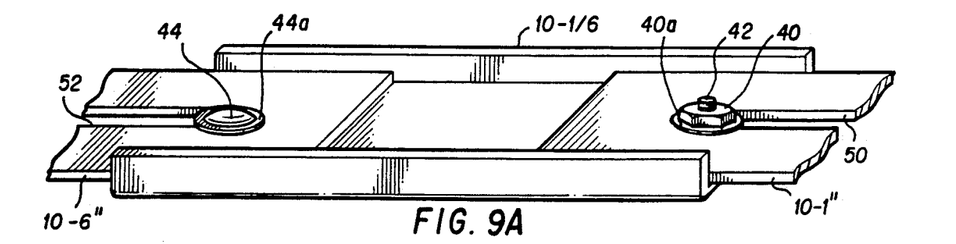
FIGS. 9A-9C show simplified fragmentary oblique views of respective segment overlap configurations that may be used in practicing the present invention, the associated tightening mechanisms being deleted in each case for the sake of clarity.
Figure 9B:
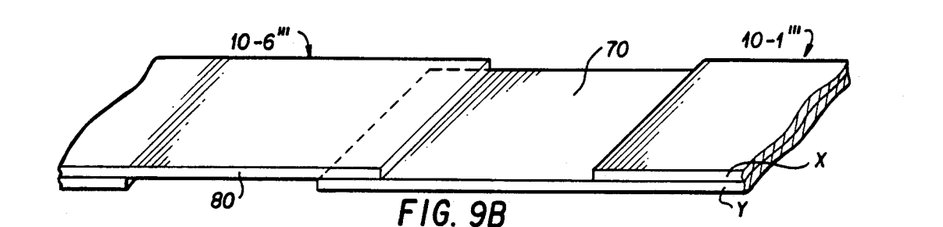
Figure 9C:
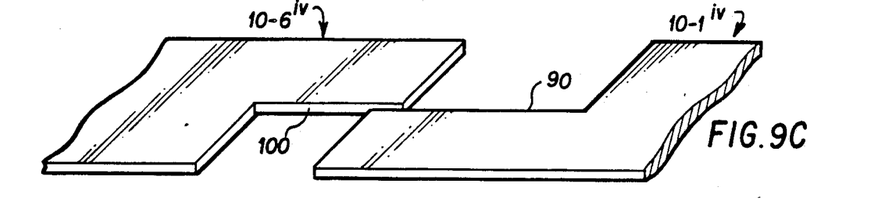

Referring to FIGS. 9A-9C there are shown a number of different segment overlap configurations which may be used in practicing the present invention. The first of these, shown in FIG. 9A, has already been described in connection with FIGS. 8A-8C The second of these, shown in FIG. 9B, includes a segment 10-1''' having a tail end with radially disposed terminal step 70, and a segment 10-6''' having a head end with a radially disposed terminal step 80 that is adapted to fit into terminal step 70 of segment 10-1'''. The advantage of the embodiment of FIG. 9B is that it may be constructed very simply by fastening together pairs of component arcuate straps such as X and Y which are circumferentially offset from one another. The third of these segment overlap configurations, shown in FIG. 9C, includes a segment 10-1$^{iv}$ having a tail end with an axially disposed terminal step 90, and a segment 10-6$^{iv}$ having a head end with a matching axially disposed terminal step 100. While the embodiment of FIG. 9C has the advantage that it permits the construction of a hoop which has an inner surface that is not only approximately circular or piecewise continuous but actually circular (if deformations that are produced by the tightening of the hoop are neglected), it is not regarded as one of the preferred embodiments of the invention. This is because it does not permit the head end of each segment to rest on and slide over the tail end of the adjacent segment. This, in turn, prevents the ends of adjacent segments from cooperating to provide a tightening action which starts and operates as smoothly as that of the preferred embodiments.

While the present invention has been described with reference to a number of specific embodiments, it will be understood that the true spirit and scope of the present invention should be determined only with reference to the appended claims.

What is claimed is:

1. A seating tool for facilitating the seating of a tubeless tire on a rim including, in combination:
   (a.) a plurality N of relatively inflexible arcuate segments each having a first end and a second end, and each having an arcuate length greater than the circumference of the tire divided by N, N being equal to three or more, the first end of each segment being positioned in overlapping relationship to the second end of another, adjacent segment to form a closed approximately circular hoop comprising N adjacent pairs of overlapping arcuate segments;
   (b.) a plurality N of threaded tightening mechanisms bridging the ends of respective adjacent pairs of segments, each tightening mechanism including a male threaded tightening member attached to one of the segments of the respective adjacent pair of segments and a female threaded member attached to the other of the segments of the respective adjacent pair of segments, the male and female threaded members of each tightening mechanism being threadedly engaged with one another;
   (c.) whereby the approximately equal tightening of said tightening mechanisms causes said hoop to collapse and thereby produce an approximately symmetrical distribution of slip/compression within a tire positioned within said hoop.

2. The seating tool of claim 1 in which at least one of the threaded members of each tightening mechanism defines a driving surface adapted to be driven by a pneumatic wrench.

3. The seating tool of claim 2 in which the longitudinal axis of each male threaded tightening member is positioned approximately parallel to a line tangent to said hoop in the vicinity of the overlapped ends of a respective one of said adjacent pairs of arcuate segments.

4. The seating tool of claim 3 in which the radial distance between each of said longitudinal axes and the respective one of said tangent lines is large enough to permit the respective driving surface to be driven by said pneumatic wrench.

5. The seating tool of claim 1 in which the second end of each segment is relatively more inflexible than the first end thereof, whereby the portions of the hoop which are relatively near the tightening mechanisms are relatively more inflexible than the portions of the hoop which are relatively far from the tightening mechanisms.

6. The seating tool of claim 1 in which the arcuate length of the overlapping portions of each of said adjacent pairs of segments increases as the respective tightening mechanism is tightened and decreases as the respective tightening mechanism is loosened.

7. A seating tool for facilitating the seating of a tubeless tire on a rim including, in combination;
 (a) a plurality N of arcuate members each having a head end, a tail end, and a curved inner surface, N being equal to three or more, the arcuate length of each of said curved inner surfaces being greater than the circumference of the tire divided by N;
 (b) the head and tail ends of said arcuate members being positioned in a head-to-tail configuration, with the head and tail ends of adjacent arcuate members defining respective regions of arcuate overlap with respect to one another, to form a closed approximately circular hoop that includes N adjacent pairs of arcuate members, the ends of the arcuate members of each of said pairs being adapted to slide smoothly over one another;
 (c) a plurality N of threaded tightening mechanisms, attached to the hoop in bridging relationship to respective regions of overlap for smoothly varying the arcuate lengths of said regions, each threaded tightening assembly including attaching means for attaching that tightening assembly to the arcuate members of a respective one of said adjacent pairs of arcuate members;
 (d) whereby the approximately equal tightening of the tightening mechanisms causes the circumference of the hoop to be reduced by approximately equal amounts at N approximately equally spaced locations.

8. The seating tool of claim 7 in which each of the tightening mechanisms includes a driving surface adapted to be driven by a pneumatic wrench.

9. The seating tool of claim 7 in which one of the ends of each arcuate member is relatively flexible and the other of the ends thereof is relatively inflexible.

10. The seating tool of claim 9 in which the relatively inflexible end of each arcuate member is arranged to rest on the tire, and in which the relatively flexible end of each arcuate member is arranged to rest on the relatively inflexible end of the adjacent arcuate member.

11. The seating tool of claim 7 in which said tightening mechanisms and regions of overlap together define N respective hoop tightening sites, and in which the tightening of each tightening mechanism causes the arcuate members of the respective tightening site to move symmetrically with respect to that site.

12. The seating tool of claim 7 in which one end of each arcuate member defines an interior channel shaped to receive the opposite end of the adjacent arcuate member.

13. A seating tool for facilitating the seating of a tubeless tire on a rim including, in combination:
 (a) a plurality N of relatively flexible first arcuate members each having a curved inner surface, N being equal to three or more;
 (b) a plurality N of relatively inflexible second arcuate members each having a curved inner surface;
 (c) said first and second arcuate members being positioned to form a closed approximately circular hoop in which each end of each first arcuate member is disposed in overlapping relationship to a respective end of an adjacent second arcuate member, said hoop having a maximum circumference larger than that of the tire;
 (d) wherein the adjacent ends of each adjacent pair of arcuate members define respective regions of arcuate overlap, the arcuate members defining each region of overlap being free to slide circumferentially over one another;
 (e) a plurality of threaded tightening mechanisms attached to said hoop for varying the arcuate lengths of respective regions of overlap;
 (f) whereby the approximately equal tightening of the tightening mechanisms causes an approximately symmetrically distributed reduction in the circumference of the hoop.

14. The seating tool of claim 13 in which each tightening mechanism includes a driving surface adapted to be driven by a pneumatic wrench.

15. The seating tool of claim 13 in which said tightening mechanisms and regions of overlap together define respective hoop tightening sites, and in which the tightening of said tightening mechanisms causes the arcuate members at each reduction site to move symmetrically with respect to that tightening site.

16. The seating tool of claim 13 in which each first arcuate member comprises an arcuate strap and in which each second arcuate member defines an interior channel shaped to receive said strap.

17. The seating tool of claim 13 in which the hoop includes 2N regions of overlap, and 2N tightening mechanisms.

18. The seating tool of claim 17 in which a pair of tightening mechanisms is attached to each second arcuate member, further including a rotatable coupling member connected between the tightening mechanisms of each of said pairs of tightening mechanisms, so that the tightening of one tightening mechanism of each such pair simultaneously lightens the other tightening mechanism of that pair.

19. A seating tool for facilitating the seating of a tubeless tire on a rim including, in combination:
 (a) a plurality N of relatively inflexible arcuate straps each having a first end and a second end, and each having a curved inner surface, N being equal to three or more, the arcuate length of each strap being greater than the circumference of the tire divided by N;
 (b) the first end of each strap being disposed in overlapping relationship to the second end of another, adjacent strap to define a sliding arcuate contact, said straps together forming a closed approximately circular hoop made up of N adjacent pairs of straps;
(c) a set of N male threaded tightening members;
(d) s set of N female threaded tightening members;
(e) first attaching means for supporting the tightening members of one of said sets of tightening members near the first ends of respective straps;
(f) second attaching means for supporting the tightening members of the other of said sets of tightening members near the second ends of respective straps;
(g) said attaching means serving to position the sets of male and female tightening members with respect to one another so that, when adjacent male and female tightening members are threadedly engaged, each male tightening member bridges a respective arcuate contact;
(h) whereby the approximately equal tightening of the threadedly engaged sets of tightening members causes said hoop to collapse in an approximately symmetrical manner.

20. The seating tool of claim 19 in which one of the tightening members of each threadedly engaged set of tightening members defines a driving surface adapted to be driven by a pneumatic wrench.

21. The seating tool of claim 19 in which the second end of each strap is relatively more inflexible than the first end thereof, whereby the portions of the hoop which are relatively near the arcuate contacts are relatively more inflexible than the portions of the hoop which are relatively far from the arcuate contacts.

22. The seating tool of claim 19 in which the longitudinal axis of each male threaded tightening member is positioned approximately tangent to the hoop near the respective arcuate contact.

* * * * *